UNITED STATES PATENT OFFICE.

JOSEPH BIERER AND CHARLES DE LA HARPE, OF BASLE, SWITZERLAND, ASSIGNORS TO L. DURAND, HUGUENIN & CO., OF SAME PLACE, ST. FONS, FRANCE, AND HÜNINGEN, GERMANY.

BLUE DYE.

SPECIFICATION forming part of Letters Patent No. 531,148, dated December 18, 1894.

Application filed August 22, 1894. Serial No. 521,033. (No specimens.) Patented in France July 4, 1893, No. 231,316, and in England July 4, 1893, No. 24,802.

*To all whom it may concern:*

Be it known that we, JOSEPH BIERER, a citizen of the French Republic, and CHARLES DE LA HARPE, a citizen of the Swiss Republic, residing at Basle, Switzerland, have invented certain Improvements in the Manufacture of Blue Coloring-Matters, (for which patents have been granted in France, No. 231,316, dated July 4, 1893, and in England, No. 24,802, dated July 4, 1893,) of which the following is a specification.

We have discovered that the phenolsulfonic acids may be caused to combine with gallocyanin-dyes, when in solution and under the influence of heat, the product of the reaction being certain leuco-compounds, slightly colored compounds which, when oxidized assume a blue to blue-violet color.

In producing these compounds which form the subject of the present invention, we preferably employ the beta-naphtholsulfonic acid of Schaeffer, while, by the term "gallocyanin-dyes" we refer to the condensation products of the hydrochlorate of nitrosodialkylanilin or of the hydrochlorate of dialkylamidoazobenzene with gallic acid or a derivative thereof, as for example, gallamic acid or gallamid, the methylether of gallic acid, &c.

The production of these new coloring matters will be clearly understood from the two following examples:

*Example I. Production of the coloring matter by the combination of the beta-naphtholsulfonic acid of Schaeffer with the gallocyanin-dye resulting from the condensation of gallic acid with the hydrochlorate of nitrosodimethyl-anilin.*—To render the reaction as simple as possible, we first produce in the usual manner, the beta-naphtholsulfo acid of Schaeffer. After the mass has cooled, the gallocyanin-dye is added in a powdered form in the proportion of three hundred parts of gallocyanin to two hundred and twenty parts of the naphthol employed in the production of the beta-naphtholsulfonic acid. The mass is then slightly heated for a short time on the water-bath until the original coloration of the gallocyanin-dye has disappeared after which the mass is placed in water. As the leuco-compound thus formed is slightly soluble in pure and acidulated water, the free sulfuric acid may be best removed by means of a salt-water solution. The purified leuco-compound is then dissolved in alkali and oxidized by the contact of this solution with the atmosphere, whereby it is transformed into a coloring matter which may be precipitated by addition of dilute acid to the solution. The coloring matter thus produced dyes wool when mordanted with chrome-mordants in an acid bath to a bright blue-violet tint. The leuco-body may also be employed in calico-printing if care be taken to oxidize it on the fiber.

The new coloring matter is soluble in cold water, and dissolves in sodium acetate solution with a blue coloration. In a ten per cent. soda solution and in caustic soda it dissolves with a blue-violet coloration. It is sparingly soluble in alcohol and also sparingly soluble in glacial acetic acid with a violet coloration. In concentrated sulfuric acid it dissolves with a blue-gray coloration which by the addition of a little nitric acid becomes first violet-brown and then brown. In concentrated nitric acid it dissolves with a brown-violet coloration.

By the addition of sodium bisulfite to a solution of the coloring matter in soda, a black-violet precipitate is thrown down, the color of which changes to black-green. This precipitate represents the leuco-compound obtained from the condensation of the beta-naphtholsulfonic acid of Schaeffer with the gallocyanin-dye.

*Example II. Production of the coloring matter by the combination of the beta-naphtholsulfonic acid of Schaeffer with the gallocyanin-dye resulting from the condensation of gallamic acid with the hydrochlorate of diethylamidoazobenzene or the hydrochlorate of nitrosodiethylanilin.*—To a solution of forty kilograms of the beta-naphtholsulfonic acid of Schaeffer in one hundred and sixty kilograms of sulfuric acid at 66° Baumé are gradually added thirty-three kilograms of the coloring matter resulting from the action of gallamic acid on the hydrochlorate of diethylamidoazobenzene or upon the hydrocholorate of nitrosodiethylanilin. The mixture having been effected, the mass is heated on the water-bath to complete the reaction and the product is run into water when hydrochloric acid no longer escapes. The resulting leuco-body is filtered, washed and dried and appears as a greenish precipitate of acid character, insoluble in water. The quantity of the leuco-body thus obtained is dissolved in an aqueous solution of forty kilograms of caustic soda at 36° Baumé, and is oxidized by contact of this solution with the atmosphere. The coloring matter may be precipitated by the addition of about forty kilograms of ordinary hydrochloric acid. Its solution in alkali is blue-violet, and in sodium acetate, blue. In concentrated sulfuric acid, it disolves with a blue coloration, which on addition of water changes to red, with a precipitation of the coloring matter.

This coloring matter dyes wool and silk in an acid bath, and has a strong affinity for metallic mordants, especially chrome mordants. The tints obtained with chrome mordants are blue, and are fast both to light and washing.

The coloring matter may also be applied in calico printing. The leuco-body itself may also be printed on the calico, and after printing may be oxidized to the desired color as will be readily understood.

Having thus described our invention, we claim—

1. The herein described improvement in the manufacture of blue coloring matters, consisting in the production of a leuco-body or product of condensation by the action of a phenolsulfonic acid on a gallocyanin-dye.

2. The herein described improvement in the manufacture of blue coloring matters, consisting in the condensation of beta-naphtholsulfonic acid of Schaeffer with a gallocyanin-dye obtained by the action of hydrochlorate of nitrosodialkylanilin or of hydrochlorate of dialkylamidoazobenzene on gallic acid or its derivatives.

3. The herein described improvement in the manufacture of blue coloring matters, which consists in the oxidation of the product of condensation of a phenolsulfonic acid with a gallocyanin-dye.

4. The herein described improvement in the manufacture of blue coloring matters, which consists in oxidizing the product of condensation of the beta-naphthol sulfonic acid of Schaeffer and a gallocyanin-dye resulting from the condensation of hydrochlorate of nitrosodialkylanilin, or of hydrochlorate of dialkylamidoazobenzene and gallic acid or its derivatives.

5. The herein described improvement in the manufacture of blue coloring matters, which consists in exposing to contact with the atmosphere, a solution in alkali of the condensation product resulting from the action of the beta-naphtholsulfonic acid of Schaeffer on a gallocyanin-dye resulting from the condensation of hydrochlorate of nitrosodialkylanilin or of hydrochlorate of dialkylamidoazobenzene with gallic acid or its derivatives.

6. As a new article of manufacture, the herein described coloring matter produced by the oxidation of the product of condensation of the beta-naphthol sulfonic acid of Schaeffer with a gallocyanin-dye, said coloring matter dyeing wool when mordanted with chrome mordants, in an acid bath, to a blue tint, and being soluble in alkalies with a violet-blue coloration, and in concentrated sulfuric acid and sodium acetate solution with a blue coloration.

In witness whereof we have hereunto signed our names in the presence of two subscribing witnesses.

JOSEPH BIERER.
CHARLES DE LA HARPE.

Witnesses:
GEORGE GIFFORD,
C. A. BURCKHARD.